(12) United States Patent
Mahn et al.

(10) Patent No.: US 7,095,606 B2
(45) Date of Patent: Aug. 22, 2006

(54) ELECTRIC SWITCHGEAR WITH AN ENCLOSED DESIGN

(75) Inventors: Gildo Mahn, Charneca da Caparica (PT); Achim Milbich, Waghaeusel (DE); Brunhilde Wenge, Eichenbarleben (DE)

(73) Assignee: Siemens Aktiengesellschaft, Munich (DE)

( * ) Notice: Subject to any disclaimer, the term of this patent is extended or adjusted under 35 U.S.C. 154(b) by 349 days.

(21) Appl. No.: 10/487,891

(22) PCT Filed: Aug. 28, 2002

(86) PCT No.: PCT/DE02/03194

§ 371 (c)(1),
(2), (4) Date: Feb. 26, 2004

(87) PCT Pub. No.: WO03/026089

PCT Pub. Date: Mar. 27, 2003

(65) Prior Publication Data

US 2004/0240160 A1    Dec. 2, 2004

(30) Foreign Application Priority Data

Aug. 30, 2001  (DE) ................ 101 43 715

(51) Int. Cl.
*H02B 1/20* (2006.01)
(52) U.S. Cl. .................. 361/612; 220/89.2; 220/89.1; 220/89.3; 361/676
(58) Field of Classification Search ................ 361/612; 220/89.1, 89.2, 89.3
See application file for complete search history.

(56) References Cited

U.S. PATENT DOCUMENTS 3,619,726 A * 11/1971 Boersma ...................... 361/612
5,689,097 A * 11/1997 Aufermann et al. ......... 218/157
2002/0117901 A1* 8/2002 Spivey et al. ............... 307/117

* cited by examiner

*Primary Examiner*—Lynn D. Feild
*Assistant Examiner*—Biju Chandran
(74) *Attorney, Agent, or Firm*—Morrison & Foerster LLP

(57) ABSTRACT

The aim of the invention is to prevent an unwanted conduction of a flow of gas inside a channel that connects an inner space of an enclosed switchgear (1) to another space. To this end, the channel is closed by means of a closing mechanism according to an increase in pressure in the inner space.

7 Claims, 2 Drawing Sheets ca. 190° - 195°

ELECTRIC SWITCHGEAR WITH AN ENCLOSED DESIGN

CLAIM FOR PRIORTY

This application claims priority to International Application No. PCT/DE02/03194 filed Aug. 28, 2002, which was published in the German language on Mar. 27, 2003, which claims the benefit of priority to Germany Application No. 10143715.3 which was filed in the German language on Aug. 30, 2001.

TECHNICAL FIELD OF THE INVENTION

The invention relates to an electrical switchgear assembly of an encapsulated design, and in particular, to an assembly having a channel, which connects an interior space in the switchgear assembly to a further space, for guiding a flow of gas.

BACKGROUND OF THE INVENTION

A switchgear assembly is disclosed, for example, in German patent specification DE 196 95 304 C1. The known switchgear assembly is an electrical assembly for the medium-voltage range, which is essentially physically bounded by two or more switchgear cabinets arranged in a row. Various electrical devices, such as electrical lines, transformers, busbars and power breakers are arranged in the switchgear cabinets, which act as encapsulation.

If a fault occurs within the encapsulated switchgear assembly causing an arc to form, the arc results in a pressure wave forming within the switchgear assembly. In order to prevent the encapsulation of the switchgear assembly which is present there from being destroyed, provision is made for the flow of gas produced as a result of the arc to be passed to the outside via channels. In order to ensure that persons and objects located in front of the outlet openings of the channel are protected, the outlet openings are each provided with a damping element. This damping element has a large number of deflector elements, which act as a labyrinth for the flow of gas. The damping element considerably increases the length of the path of the flowing gas. In addition, the deflector elements act as cooling elements. The gas flow conditions of the damping element outlet can be coped with easily and are non-hazardous.

A large number of individual deflector elements are required for the damping element to act effectively. In order to guide the flow of gas along a flow path which is as long as possible past as many deflector elements as possible, a physical volume is required which cannot be reduced indefinitely. The design of the damping element, which cannot be reduced in size indefinitely, restricts the arrangement of such a damping element on a switchgear assembly considerably. In addition, it is problematic to point the outlet opening of such a damping element in any desired direction, for example at a point of access for the operator on the switchgear assembly or directly against building walls. Even when the damping element damps and cools the flow of gas very effectively, a risk to persons and material cannot be ruled out. Owing to the abovementioned conditions, the known designs are quite restricted with respect to the arrangement of channels on encapsulated switchgear assemblies.

SUMMARY OF THE INVENTION

The invention forms a channel for guiding a flow of gas such that a more flexible arrangement of inlet and outlet openings of the channel is made possible.

In the invention, an electrical switchgear assembly makes it possible for the channel to be closed in the event of an increase in pressure in the interior space.

With the known switchgear assemblies, the object was to pass the increase in pressure occurring in the interior space to the outside through openings and channels, which may be opened only if required. In contrast to this, provision is made for the channel to be closed in the event of a critical increase in pressure occurring in the interior space. This prevents hot gases from being able to emerge from this channel, for example in the event of an arc in the interior space. This means that the arrangement of such channels is highly flexible. Various openings in such channels may be provided which are open in the steady-state mode of operation, and thus make it possible for cooling air to flow through the encapsulating housing of the switchgear assembly. These openings can even be aligned in the direction of the points of access for the operator on the switchgear assembly, since the operator is protected against the flow of hot gases owing to the closeable construction.

In addition, the invention advantageously provides for the channel to have an associated closing mechanism, by means of which the channel can be closed as a function of the pressure difference between the interior space and the further space.

If the channel has an associated closing mechanism, then it can be closed mechanically in a simple manner. If use is made of the pressure difference between the interior space, in which an arc burns, for example, and the further space, there is no need to detect additional variables for controlling the closure of the closing mechanism. The use of the pressure difference for closing the closing mechanism is an extremely reliable and cost-effective way of controlling the closure of the channel. The channel may connect both the interior space of a switchgear assembly to the surroundings of the switchgear assembly and the interior space of the switchgear assembly to a further space, for example an adjacent switchgear cabinet. In the normal mode of operation, the channel is used for cooling purposes and is closed in the event of a fault.

One advantageous embodiment provides for it to be possible for the channel to be closed permanently by the increase in pressure.

If the channel is closed permanently, the response of the closing mechanism can easily be established by visual inspection or other suitable testing methods. When it is then detected that the fault, which had resulted in the closure of the channel, has been eliminated, then the closing mechanism can be opened once again. This ensures that no spontaneous, undesired opening and closing of the channel occurs.

Advantageously, the invention also provides for it to be possible for the channel to be closed by plastic deformation of the closing mechanism.

Plastic deformation on the closing mechanism makes it possible to achieve refinements for the closure element itself which are very simple in design terms. In addition, the stability of the closing mechanism can easily be used to set the response sensitivity of the closing mechanism. Depending on the level of the increase in pressure in the interior space at which a response is desired, the closing mechanism may be designed such that a larger or smaller force is required for plastic deformation.

In addition, the invention may advantageously provide for the closing mechanism to have a valve which can pivot in the event of plastic deformation of its fastening means.

Such a valve which can pivot is a refinement which is extremely simple in design terms. It is thus possible to dispense with complicated configurations of the closure element.

The invention may provide for the valve which can pivot to be a sheet-metal plate which protrudes into the channel.

The use of a sheet-metal plate is one of the simplest refinements for the valve. Such sheet-metal plates can be produced very easily in a stamping process. Once the valve has closed, the actuated valve can be replaced by a valve which has not yet been loaded at very little expense. There is thus no need for the valve to be repaired and refitted following a response.

Owing to the fact that unused valves are always used, the response behavior of the valve can be assumed to be constant.

The invention also provides for the closing mechanism to have an associated locking apparatus which latches in on closure and prevents the channel from opening.

When a fault arc, which has brought about a very rapid, very pronounced increase in pressure in the interior space of the electrical switchgear assembly, has been extinguished, it is possible that a reduced pressure will result in the interior space once the arc has been extinguished. Locking apparatuses are provided to prevent the closing mechanism from being opened in an undesired manner by the reduced pressure and opening the channel again. Such locking apparatuses may be, for example, bolts, which are provided with a barbed profile and become hooked and wedged together on fixed edges of the body when the closure element closes. Furthermore, diverse, further variants of the locking apparatus may be conceived.

DETAILED DESCRIPTION OF THE INVENTION

With reference to exemplary embodiments, the invention is described in more detail below and illustrated in the drawings below, in which.

DETAILED DESCRIPTION OF THE INVENTION

Figure 1:
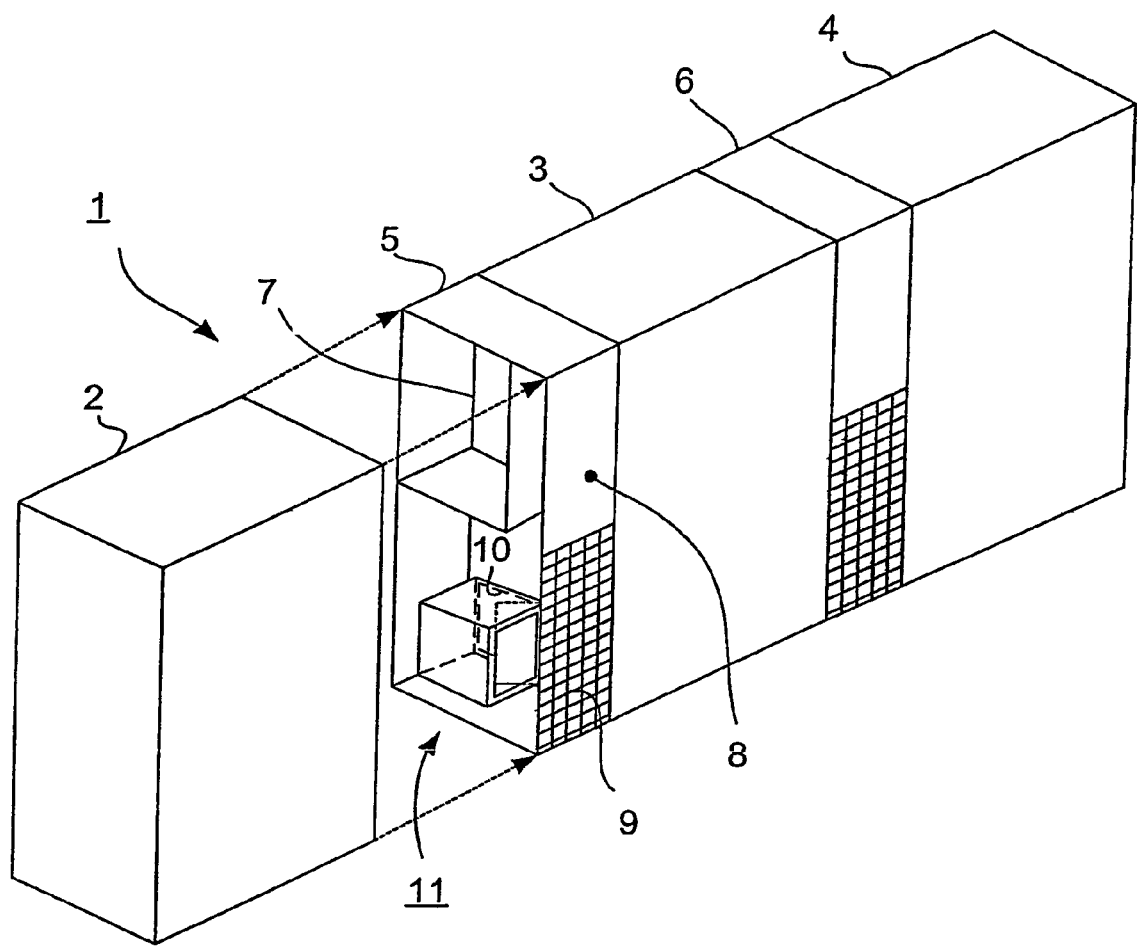
FIG. 1 shows the schematic construction of an encapsulated electrical switchgear assembly.

The switchgear assembly 1 shown schematically in FIG. 1 is a sheet-steel encapsulated switchgear assembly, which essentially has a first switchgear cabinet 2, a second switchgear cabinet 3 and a third switchgear cabinet 4. It is possible to arrange various electrical modules such as power breakers, current and voltage transformers, cable connections, etc. within the switchgear cabinets 2, 3, 4. A first cooling channel 5 is arranged between the first switchgear cabinet 2 and the second switchgear cabinet 3. A second cooling channel 6 is arranged between the second switchgear cabinet 3 and the third switchgear cabinet 4. The construction of such a cooling channel is explained using the example of the first cooling channel 5. The first cooling channel 5 is delimited at the sides by the respective side walls of the first switchgear cabinet 2 and the second switchgear cabinet 3. In order to provide the busbars running through the individual switchgear cabinets with an encapsulated bushing, a busbar space 7 is partitioned off from the cooling channel 5. The outer face 8 of the first cooling channel 5 has a suitable material, for example sheet steel, wrapped around it. The outer face 8 of the cooling channel 5 has a large number of inlet openings 9. Cooling air can pass into the cooling channel 5 through these inlet openings 9 and flow along between the side walls of the first switchgear cabinet 2 and the second switchgear cabinet 3. The cooling channel 5, owing to the thermal conduction via the side walls of the first switchgear cabinet 2 and the second switchgear cabinet 3, cools the interior spaces of the adjoining switchgear cabinets. In order to improve the cooling action of the first cooling channel 5, the side wall of the second switchgear cabinet 3 has an opening 10. This opening 10 makes it possible for air to be exchanged between the first cooling channel 5 and the interior space of the second switchgear cabinet 3 and for the cooling of the individual modules to be improved further still. In order to further improve the cooling action, forced ventilation of the first cooling channel 5 may also be provided. The opening 10 is provided with a special cap 11.

Figure 2:
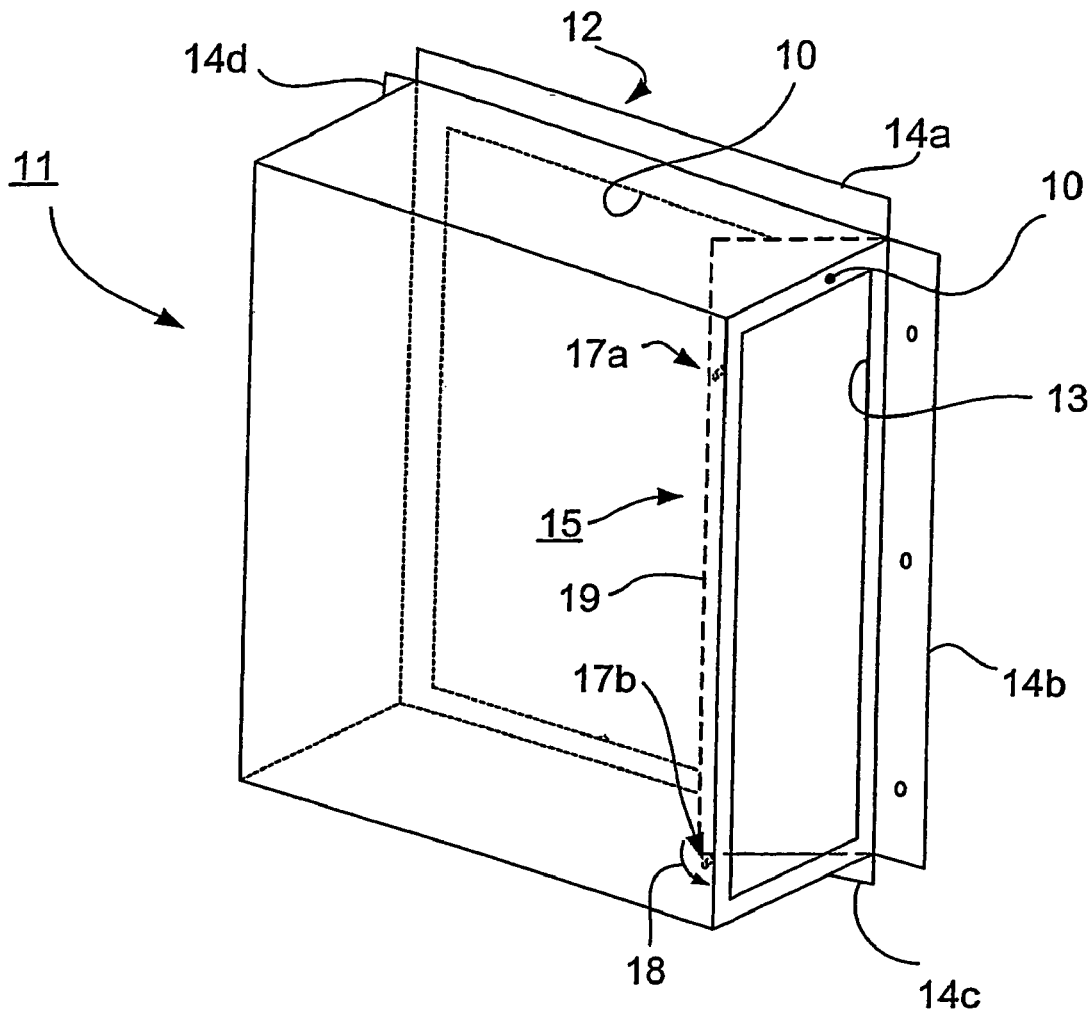
FIG. 2 shows the schematic construction of a cap having an interlocking mechanism.

The construction and the mode of operation of the cap 11 will now be explained with reference to FIG. 2. The cap 11 is essentially rectangular. In order to achieve a configuration in the form of a cap, one of the bases of the rectangle is open. This base 12 faces the opening 10. A channel inlet opening 13 is arranged in a narrow face of the cap 11. The cap 11 forms a channel which connects an interior space of the switchgear assembly, i.e. the interior space of the second switchgear cabinet 3, to a further space, the first cooling channel 5 for the purpose of guiding a flow of gas. The channel extends from the channel inlet opening 13 via the cap 11, the open base 12 and the opening 10 into the second switchgear cabinet 3. In order to permanently arrange the cap 11 over the opening 10 in the side wall of the second switchgear cabinet 3, the cap 11 in each case has bent-back tabs 14a, 14b, 14c, 14d on its base 12. These tabs can be connected in a suitable manner to the side wall of the second switchgear cabinet 3, for example by screwed, riveted or welded connections. The channel inlet opening 13 also has an associated closing mechanism 15.

Figure 3:
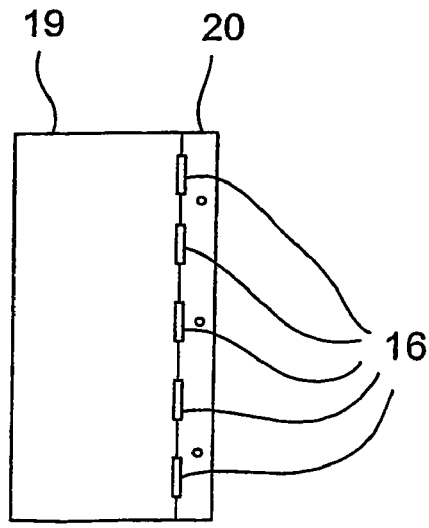
FIG. 3 shows a plan view of a valve which can pivot.
Figure 4:
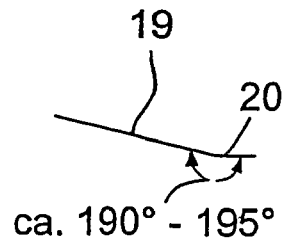
FIG. 4 shows a side view of a valve which can pivot.

The closing mechanism 15 has a valve 19 which protrudes into the channel. The valve 19 is held by means of a hinge 20 which can move in the event of plastic deformation. Two or more slots 16 are used to form a bending point, along which it is preferred for plastic deformation to take place (see FIG. 3). The valve 19 is slightly bent back along the slots 16 (see FIG. 4). In order to fix the valve 19, the hinge 20 can be clamped in under the lateral tab 14b which is adjacent to the narrow face 21 having the channel inlet opening 13. It is thus possible in a simple manner to fix the closure element 15 together with the cap 11 to the side wall of the second switchgear cabinet 3. Detachable connection elements, such as screws or rivets, are advantageously used for this purpose.

Two locking apparatuses 17a, b are provided on the face opposite the base 12. The locking apparatuses 17a, b are arranged essentially perpendicularly on the face and are of identical construction. They are in the form of a bolt. When the closing mechanism 15 closes, the free end of the valve 19 engages behind the locking apparatuses 17a, b. The deformation of the hinge 20 and, in addition, the locking apparatuses 17a, b lock the valve 19 in the closed position.

Conversely, the locking apparatuses 17*a, b* may also be arranged on the valve 19, and, in the closed state, engage behind an edge of the channel inlet opening 13.

In the steady-state mode of operation, the channel inlet opening 13 allows a continuous flow of air and exchange of air. The flow rate of the gas is in this case so low that the closing mechanism 15 is not actuated. When there is suddenly an elevated pressure within the switchgear cabinet 3 is the valve 19 moved in the direction of the arrow 18 owing to the high pressure and the high flow rate of the gas, and the channel inlet opening 13 closes. The locking apparatuses 17*a*, 17*b* hold the valve 19 securely in its closed position. The pivot of the closing mechanism 15 in this case extends along the bending line predetermined by the slots 16. It is thus no longer possible for there to be an exchange of gas between the interior of the switchgear cabinet 3 and the first cooling channel 5 via the channel inlet opening 13.

The arrangement of such a closing mechanism 15 is not restricted to it being arranged in cooling channels arranged between two switchgear cabinets. Such closing mechanisms 15 may also be arranged at any desired point on a switchgear cabinet at outlet openings to the outside. This results in favorable refinements with respect to a flexible design for encapsulated electrical switchgear assemblies.

The invention claim is:

1. A channel guiding a flow of gas in an electrical switchgear assembly of an encapsulated design, which connects an interior space of the switchgear assembly to a further space, a closure valve, which can pivot and which closes the channel in the event of an increase in pressure in the interior space, protruding into the channel, wherein the closure valve which can pivot closes the channel in the event of an increase in pressure with plastic deformation of a bending point.

2. The channel as claimed in claim 1, wherein the channel remains closed permanently following the increase in pressure.

3. The channel as claimed in claim 1, wherein the closure valve which can pivot is a sheet-metal plate which protrudes into the channel.

4. The channel as claimed in claim 1, wherein the closure valve which can pivot has an associated locking apparatus which latches in on closure and prevents the channel from opening.

5. The channel as claimed in claim 1, wherein the channel is formed at least partly from a cap, which is placed on a wall with a fastening region of the closure valve which can pivot forming an intermediate layer, is firmly connected to the wall and covers an opening in the wall.

6. The channel as claimed in claim 5, wherein the cap is rectangular.

7. The channel as claimed in claim 5, wherein the cap deflects a flow of gas through approximately 90°.

* * * * *